Jan. 10, 1928.

D. E. COE 1,655,752

MILL BANDING AND METHOD OF SPLICING THE SAME

Filed Jan. 16, 1925

Inventor:
Daniel E. Coe
By
Pennington & White
Attorneys.

Patented Jan. 10, 1928.

1,655,752

UNITED STATES PATENT OFFICE.

DANIEL EDGAR COE, OF HOLBROOK, MASSACHUSETTS.

MILL BANDING AND METHOD OF SPLICING THE SAME.

Application filed January 16, 1925. Serial No. 2,943.

This invention relates to improvements in endless bands and belts for use in transmitting power or driving parts of machinery, and also in the method of splicing the same.

One object of the improvement is to produce an endless band or belt from a strip of textile material having its ends spliced together to provide a strong joint without the use of hooks, rivets or other fastening means.

Another object of the improvement is to provide an endless band or belt in which the splice or joint is smooth and even, and substantially uniform in size with the unspliced portion of the band or belt.

Another object of the improvement is to provide strips of banding which may be supplied in predetermined lengths ready for splicing in the mill or factory to produce endless bands or belts of standard length.

Another object of the improvement is to provide a strip of banding having indicia marked thereon to designate the points where it is to be lapped in the joint to produce an endless band or belt of given length.

Another object of the improvement is to provide for greater convenience and facility in splicing the ends of the band or belt together.

Another object of the improvement is to provide a method of splicing the ends of the band or belt together which can be practiced without especial skill or expertness on the part of the operator to produce smooth and uniform joints.

Further objects of the improvement are set forth in the following specification which describes a preferred embodiment of my endless band or belt and the preferred method of splicing the banding as illustrated by the accompanying drawings. In the drawings.

Transmission bands or belts known as mill-banding are employed in large quantities in mills and factories, particularly for driving the spindles of mules, spinning- and twisting- frames, and for other purposes where the parts are rotated at high speed without requiring great power. These bands or belts are generally circular in cross-section and are fabricated in the form of a tubular cord. The preferred type of banding is a braided tubular fabric which may or may not have an interior core comprising either a solid cord or a smaller inner braided tube. In other cases the belt or band may be woven, but for the sake of speed of production and economy in cost the braided banding is preferable. The tubular strip of fabric is cut into suitable lengths and the ends of the sections spliced together in accordance with requirements to adapt the band to pass over a cylinder or drum and to drive the spindle or other part therefrom through the means of a whirl or pulley around which the band leads.

In accordance with one method of splicing the banding as heretofore practiced, one of its ends is inserted through the side of the band at a distance from its opposite end and the second end then inserted into the first end in the same manner. After the splice or joint has been completed in this way the pull on the band causes the outer tube to contract against the ends inserted therein to frictionally grip the inserted lengths to hold the joint from pulling apart. With this method of splicing the banding the inserted ends cause the band to be bulged or swelled out at the splice, or in other words, the spliced portion is distended and made larger than the main portion of the band. The enlarged portion or swelling at the splice causes the band to wear as it passes over the cylinders and pulleys and results in the splice breaking or giving away before the band itself wears out. Moreover, the band or belt will not run as smoothly and evenly over the cylinders, drums and pulleys and hence will not transmit the maximum power at a constant rate of speed to effect a smooth and uniform drive. Other means have been provided for splicing the ends of the band or belt together, such as sewing, riveting, or holding with hooks, but none of these methods has been entirely satisfactory to produce a smooth, even splice where the ends of the band are joined together. It is therefore the object of the present improvement to provide means for splicing the ends of the band together to produce a smooth, lapped joint of the same thickness as the rest of the band and, further, to render the operation more convenient and easy of accomplishment, as will now be set forth.

Figure 1:
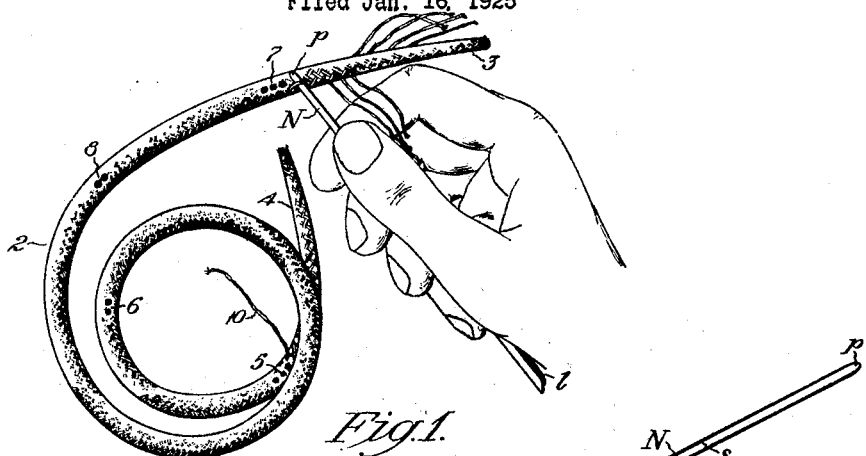
Fig. 1 shows a length of textile mill-banding and illustrates the method of preparing its ends to adapt them to be spliced together with a smooth, even joint.

Referring first to Fig. 1 of the drawings, 2 designates a length of tubular fabric banding such as commonly produced in a braiding machine. This type of banding may be braided from cotton yarn, either single ends or in multiple, and a common type has thirty-two ends or strands intermeshed with the yarns passing over and under each other in pairs to form the continuous tube. In preparing the ends of the length of banding 2 for splicing I reduce it in diameter and preferably taper the reduced ends throughout a suitable length proportioned to the extent to which they are to be inserted within the splice. As a convenient method of tapering each end of the band or strip 2 I may draw out or unravel certain of the strands from the fabric and cut them off close to the surface of the tube. For this purpose I may use any suitable instrument having a pointed end such as the splicing implement or needle N illustrated in Fig. 3 and hereinafter more fully described. An inch or two back from the tip end of the band 2 I may unravel or draw out, say half the whole number of threads or strands constituting the fabric. For instance, I may draw out eight of the sixteen double strands at stepped intervals rearwardly from the end of the band as shown in Fig. 1. One strand will be picked out and cut off at a point say an inch or so back from the end, the next strand drawn out and cut off at a point one-quarter to one-half an inch farther back and so on, whereby the tubular fabric will be gradually tapered down to a point owing to its being constituted by an increasingly less number of threads or strands progressing towards its tip end. As shown in Fig. 1. the tip of the end, back to where the first strand is drawn out and cut off, will have only eight strands, then back to the point where the next strand is cut off it will have nine strands, then back to where the next strand is cut off ten strands, and so on until at the point where the last strand is drawn out and cut off the tapered portion will merge into the full section of sixteen single or double strands as the case may be.

After the two ends of the strip or band 2 have been tapered down in this manner they are treated with a suitable composition to stiffen them and hold the threads together to prevent complete unravelling of the strands at the ends of the fabric. For this purpose I have found it preferable to use melted wax applied in a plastic state so that it will enter the interstices between the strands and form a coating and cement therefor. In other instances I may employ sizing or any other compound to produce the same effect. Moreover, in some cases instead of drawing out the strands or threads from the fabric in gradually lessening number back from the ends of the band and cutting them off, I may form the tapered length by simply clipping or cutting the fabric on an angle, although with this latter method the fabric is more liable to become frayed and ravelled so that it cannot be waxed into as smooth an end. In other cases I may reduce the diameter or thickness of the strip at its ends by compacting the fabric, for instance, by braiding the strands under greater tension.

Figure 3:
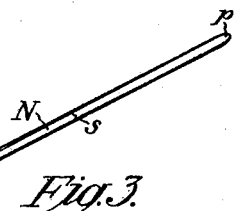
Fig. 3 is a perspective view of the splicing instrument or needle which is preferably made use of in splicing the ends of the banding.

After the ends of the band have been reduced in thickness or tapered to a pointed tip and the fabric waxed or otherwise treated as above described the ends are spliced together in the manner as next explained. Referring now to Fig. 3, I have found it most convenient to employ the splicing tool or needle N shown in Fig. 3, which forms the subject matter of my U. S. Letters Patent No. 1,583,444, dated May 4, 1926. The needle or bodkin N is constructed of thin sheet-metal rolled or bent into substantially tubular cross-section, with a seam $s$ extending throughout the greater portion of its length, and having one end formed with a rounded or rather blunt point $p$. Toward the opposite end of the needle N the tube is spread apart or opened up along the seam $s$ to provide a trough-like groove or recess $r$ for receiving the tapered end of the band 2. Overlying the top of the groove or trough $r$ is a spring-latch 1 having one end held within the confines of the closed portion of the tube and its opposite end bowed upwardly and then bent down to form a notched tooth $t$. The latch 1 is sprung upwardly and the tapered end of the fabric band 2 inserted thereunder to lie within the hollow trough $r$ at the end of the needle N, see Fig. 4. The latch 1 is then allowed to spring back so that its tooth $t$ will bite into the fabric to hold it in place in the needle N.

Figure 4:
Fig. 4 is a view illustrating the method of using the splicing needle to insert one end of the banding into the side of the other end.

Fig. 4 shows the first operation of splicing the ends of the band together, the point of the bodkin or needle N being inserted through the side of the tubular band 2 at 5 adjacent the point where the tapered portion merges into the full tubular braid. The point of the bodkin or needle N is slid through the interior of the tube, as indicated by the dotted lines in Fig. 4, and then pierced outwardly again through the side of the tube at 6. It will be understood that in inserting the needle or bodkin N into the side of the fabric the point of the needle is entered through the mesh of the braid between adjacent strands or threads, the fabric itself not being cut or mutilated. The operator pushes the bodkin through the interior of the fabric 2 to draw the tapered portion 3 of its end in through the opening at 5 and along to the point 6. That is to say, the tapering end 3 of the band 2 is threaded into the side of the tube and drawn along through its interior to the point 6, where the bodkin N is withdrawn through the side of the tube by releasing its spring-latch 1 from the fabric held thereunder. In threading the end 3 of the band 2 through the interior of the tubular fabric the latch 1 on the bodkin N acts as a guard to open the tube and prevent it from clinging or sticking to the waxed end 3, see Fig. 5. After the tapered end 3 has been drawn into place the latch 1 is easily released by lifting it at the point where its tooth t bites into the fabric.

Figure 2:
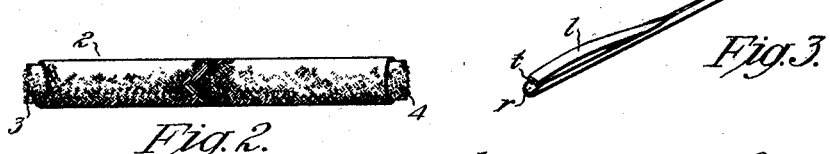
Fig. 2 shows a short length of the band or belt and illustrates the completed splice or joint having the ends of the band inserted one within the other.
Figure 5:
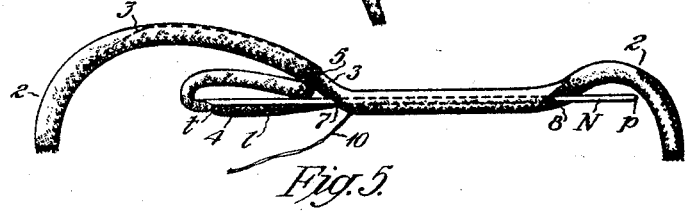
Fig. 5 is a similar view showing the method by which the second end is inserted into the side of the first end.

After one end 3 of the band has been threaded into the tube in the manner as illustrated in Fig. 4, the opposite tapered end 4 is inserted through the side of the band at the point 7 as indicated in Fig. 5. That is to say, the opposite end 4 of the band is entered through the side of the first end 3 at the point where the latter merges into the main fabric and then drawn into the interior of the tube. Now, after the needle N has been pulled through and withdrawn at 8, when the band is stretched the splice will appear as shown in Fig. 2, the two opposite ends 3 and 4 of the band 2 entering the sides of the tube at adjacent points and extending in opposite directions along the interior thereof. When the band is stretched taut the joint or splice will be drawn out with a smooth exterior without any distention or bunch on its surface. That is to say, the spliced portion of the band will have substantially the same diameter or thickness as its main length, the two tapered ends which are inserted within the tubular fabric extending smoothly along the interior thereof without bunching or bulging to cause protuberances on the surface of the fabric.

Where the banding is furnished in unspliced lengths, either as a continuous strip or in severed pieces, it is marked with suitable indicia to designate the points at which it is to be cut and spliced. For instance, I may use marks or dots of contrasting shapes or colors to indicate the points where the continuous strip is to be severed into lengths, and where the ends are to be inserted and the needle withdrawn to determine the length of the lap or splice. In Fig. 1, for example, the three dots at the point 5 indicate the length to be tapered back from the end of the band and the two dots at 6 show where the needle is to be withdrawn at the end of the splice. In other cases the dots or marks may be single and of contrasting colors.

Figure 7:
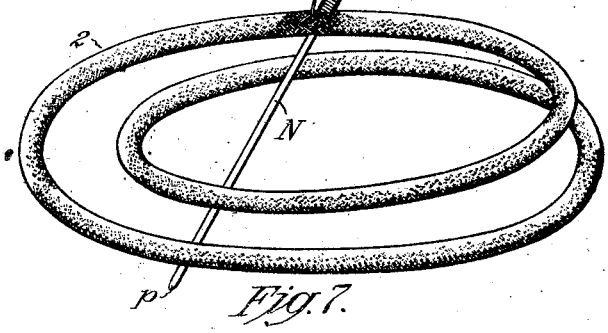
Fig. 7 illustrates the spliced band or belt and shows the manner of sewing the strands of the fabric through the splice to strengthen the joint.

To tie the threads of the band together at the point of joinder of the splice I have found it advisable in some instances to sew one or more of the strands back and forth through the fabric. For this purpose I may leave one or more of the strands 10 which are drawn or ravelled out to taper off the end of the band without cutting them off so as to have material for sewing through the finished splice. For example, as shown in Fig. 5, the last strand or strands 10 drawn back from the tapered portion 4 of the fabric are left without cutting off the threads, the end or ends 10 being caught in the end of the needle or bodkin N by drawing them under the tooth t on the latch 1. As illustrated in Fig. 7 the bodkin or needle N is first pushed through the fabric and the end 10 engaged under its latch, after which the needle is drawn through to sew the end 10 through the band at the joint therein. If desired, the end 10 may be sewed back and forth several times to prevent the splice opening at the seam where the opposite ends of the band are inserted into the sides of the tubular fabric.

Figure 6:
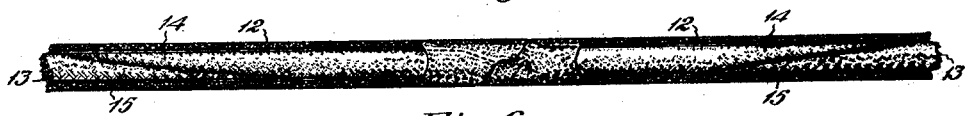
Fig. 6 is a view of another form of the spliced joint showing the outer tubular fabric in section to illustrate the manner in which the ends are inserted therein and overlapped with the inner core of the band.

The above description applies to a band or belt of tubular structure without an interior core. In some cases where it is desired to increase the strength and wearing qualities of the band a double fabric is used, that is one tube braided over another tube or over a central cord. With this latter type of banding the procedure in splicing the ends is substantially the same, except that in addition to reducing the thickness or tapering off the ends of the band which are inserted through the sides of the fabric the ends of the inner tube or core of the band are also reduced or tapered. As shown in Fig. 6, 12 represents the outer tube or fabric and 13 the inner braided tube or core. The core 13 is pulled out from the end of the tube 12, cut back for a suitable distance and then tapered down toward its tip by raveling out the strands or cutting away the threads. Now when this form of band is spliced the tapered ends 14 are inserted into the main tubular portion 12 of the band to lie alongside the tapered ends 15 of the inner core or tube 13. It will be understood of course that with this arrangement the tapered portion at the ends of the band which are inserted through the sides of the main fabric are single tubes. That is to say, the core is cut back and tapered from a point some distance within the spliced ends. Nevertheless, when the band is spliced it will have the same make-up and strength as regards its inner core, the ends of the main portion of the band taking the place of the core where the latter is removed. In other words, the band will be of double thickness throughout its whole length including its spliced portion. In this last described method of joining the ends of the band the splice is rendered particularly strong, since the ends are held together not only by the friction of the outer tube binding against the inserted lengths, but these inserted ends 14 also overlie and bind against the tapered ends 15 of the core 13. Stated briefly, there are two points at which the threads of the fabric overlie and cling together; first, where the tapered ends 15 of the interior core 13 extend lengthwise of the inserted tapered ends 14, and second, where the outer tube overlies the inserted ends of full diameter adjacent the point of joinder. Through this peculiar arrangement the splice is rendered especially strong and secure, the greater the strain on the band the greater the frictional gripping effect between the overlying or lapped sections of the splice.

The method of splicing the joint with either a single or double tubular fabric as above described provides a particularly secure joinder of the ends of the strip or band without the use of staples, rivets, hooks or other fastening means. The spliced portion of the endless band being smooth and even on the surface, without enlargements, protuberances or seams, renders the band uniform in size throughout its entire length and more efficient for the purpose intended. That is to say, the spliced portion of the band will ride over the cylinder, drum or pulley as smoothly as the main length to transmit the power evenly with a constant rate of speed between the driving and driven elements. Furthermore, the band is not subjected to undue abrasion or friction as the spliced portion passes over the drum and pulley, and therefore the whole band or belt is far more durable in use.

The improved method of splicing the ends of the banding provides for applying bands and belts of suitable lengths to different machines without removing the driving drums or cylinders. That is to say, the banding may be furnished in predetermined lengths and applied to the machines to replace worn or broken belts without taking down the machinery or removing any of its parts. The improved method of splicing the band is so simple and convenient that it can be accomplished without particular skill or expertness on the part of the operator, and by following directions in accordance with the indicia marked on the outside of the banding any number of endless bands or belts of uniform length may be applied and spliced to produce uniform results in the machine. This is of manifest importance where the bands are employed for driving spindles in multiple as in a mule or spinning-frame. It is essential that all of the spindles be driven at the same speed to produce a uniform twist in the yarn or thread and this can only be accomplished if the bands used for driving the spindles are all of the same length. With the present improvement where one or more broken or worn-out bands require replacing a new band may be applied without stopping the machine to take out the driving drum or cylinder, and after the new band has been spliced in accordance with the marking thereon it will be of uniform length with the other bands. Furthermore, the improved method of splicing the banding is much more economical, since it dispenses with staples, hooks, rivets and other fastening means, besides insuring a stronger and more durable connection between the ends of the band or belt.

Various modifications may be made as regards the construction of the band or belt and the method of splicing the ends of the strip together which would fall within the spirit and scope of the present invention. Therefore, without limiting myself to the precise details as herein described and illustrated I claim:

1. An endless band or belt consisting in a tubular strip of fabric having its end portions tapered by progressively reducing the number of strands toward the tip thereof, and said ends joined in a splice with one tapered portion inserted through the side of the fabric and extending along its interior in one direction, and the other tapered portion inserted through the side of the fabric and extending therein in the opposite direction to provide a lapped splice.

2. An endless band or belt consisting in a tubular strip surrounding an inner core with the core terminating at points rearwardly from the ends of the tube and reduced in thickness, the end portions of the strip being reduced in diameter and inserted through the sides of the strip to extend along the interior thereof in overlapping relation with the reduced ends of the core to provide a lapped joint therewith forming a splice of substantially uniform thickness and structure with the main portion of the band.

3. An endless band or belt consisting in a tubular strip of fabric having its terminal portions joined in a splice with one end inserted through the side of the fabric and extending along its interior in one direction and the other end inserted through the side of the fabric and extending therein in the opposite direction, and a strand ravelled from one of the ends of the strip and passed back and forth through the splice to bind the latter to prevent the ends from slipping.

4. An endless band or belt consisting in a tubular strip of fabric having its terminal portions tapered by progressively reducing the number of strands towards the tip thereof, and said ends joined in a splice with one tapered portion inserted through the side of the fabric and extending along its interior in one direction and the other tapered portion inserted through the side of the fabric and extended along its interior in the opposite direction and lapped with the first tapered portion, and one or more strands ravelled from the lapped ends and sewed through the splice to secure the ends together to prevent them from slipping at the joint.

In testimony whereof I affix my signature.

DANIEL EDGAR COE.